Aug. 21, 1951 T. E. MAHLON ET AL 2,565,250
FLUID MOTOR
Filed Oct. 7, 1946 4 Sheets-Sheet 1

INVENTORS
DANIEL M. BAUER
THOMAS E. MAHLON by Emery Holcombe Blair
ATTORNEYS

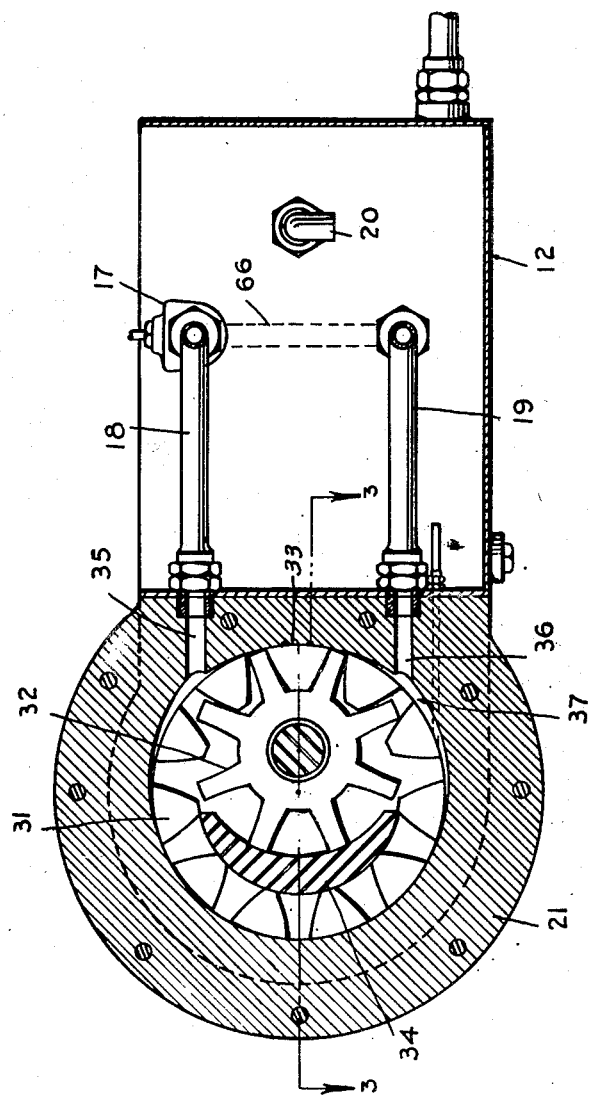

Aug. 21, 1951 T. E. MAHLON ET AL 2,565,250
FLUID MOTOR
Filed Oct. 7, 1946 4 Sheets-Sheet 4

INVENTOR:
DANIEL M. BAUER
THOMAS E. MAHLON

ATTORNEYS

Patented Aug. 21, 1951

2,565,250

UNITED STATES PATENT OFFICE 2,565,250

FLUID MOTOR

Thomas E. Mahlon, Allentown, and Daniel M. Bauer, Bethlehem, Pa.

Application October 7, 1946, Serial No. 701,706

3 Claims. (Cl. 121—70)

This invention relates to fluid motors of the type used for hydraulic transmission and differential mechanism in machinery and motor driven vehicles, and is herein illustrated with a hydraulically operated system for delivering power to the two halves of a split drive shaft, with provision for differential rotation of the two halves as imposed by power-consuming devices to which they respectively are connected, although not restricted to such a system.

Among the objects of the invention are to provide a simple, efficient and inexpensive hydraulic drive system for controlled delivery of power to the power shaft of motor vehicles or industrial machinery, or where a number of fluid motors are required to operate from a single hydraulic circuit, and which additionally is capable of acting as a brake.

A primary object is to improve and simplify the shape and arrangement of the teeth and fluid passages of gear type hydraulic motors to maintain perfect balance, avoid excessive working pressures and bearing loads, and increase the efficiency of such fluid actuated systems, thereby enabling a motor of small volume displacement to transmit a large amount of power.

Another object is to provide for such a system a novel form of hydraulic motor providing separate delivery of power from a common source to the two sections of a split power shaft.

Still another object is to provide in such a motor mechanism a novel bearing assembly and lubrication system.

In the accompanying drawings:

Fig. 2 is a vertical sectional view of the motor mechanism, on line 2—2 of Fig. 1.

Figure 1:
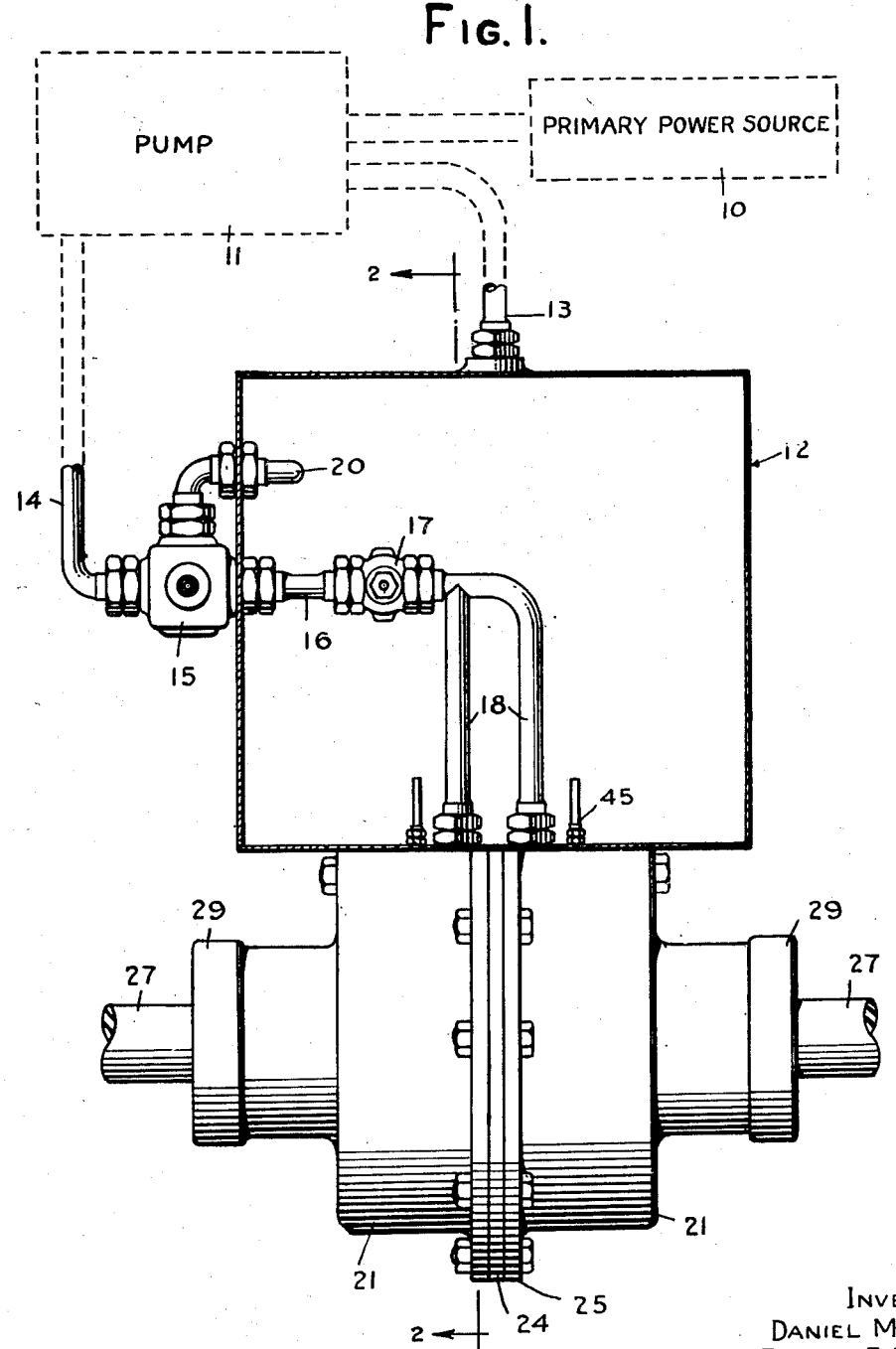
Fig. 1 is partly schematic plan of a system embodying the invention.
Figure 4:
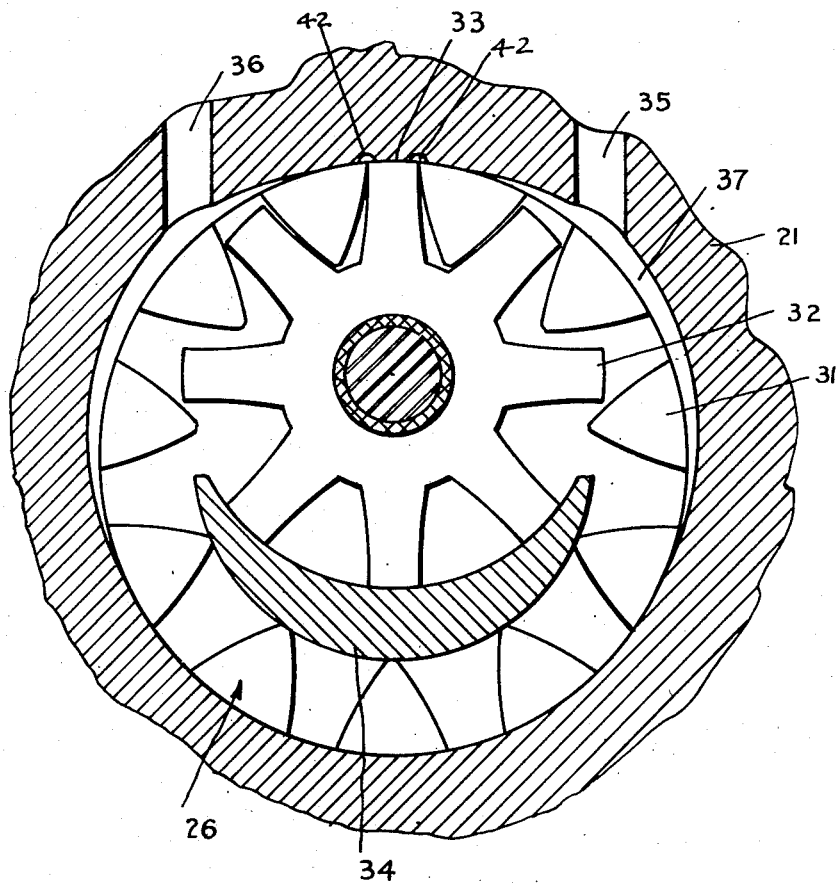
Fig. 4 is an enlarged fragmentary vertical sectional view on line 4—4 of Fig. 3.

Describing the drawings in detail, the primary source of power, which may be any suitable engine or motor is designated 10, and is suitably coupled to a hydraulic pump 11, arranged to draw pressure fluid, such as oil, from a reservoir 12 by a pipe 13 and deliver it by a pipe 14 to a multiple control valve 15, to be described later, which is arranged to select between different paths of delivery. One of these paths connects with the valve by a manifold pipe 16, passes through a blocking valve 17, which will be later described, and supplies two upper pipes 18. The other path comprises two lower pipes 19. An exhaust pipe 20 delivers from the valve 15 to the reservoir.

In the form of the invention shown in the drawings, the motors comprising the differential mechanism are enclosed in a casing, formed of two duplicate end sections 21, which together enclose a cylindrical chamber. A transverse division plate 23, which constitutes fixed heads for the motors, is secured in place by a flange 24, which is bolted between flanges 25 of the casing halves, and divides the chamber into two separate motor chambers 26. The two sections 27 of a power delivery shaft, such as the driving axle of a vehicle, extend axially into the respective chambers 26 through bearings 28 and caps 29.

Within the chambers 26, the ends of the shafts 27 carry disc-shape head plates or rotors 30 from the inner faces of which project ring gear teeth or cogs 31, arranged to mesh with the teeth of idler spur gears 32, which are mounted on the opposite faces of the division plate 23 in eccentric relation to the rotor discs 30 and the shafts 27. The diameters of the rotor discs 30, the outer surfaces of the cog teeth 31, and the eccentric mounting of the idler gears 32 are such that the outer end surfaces of the idler teeth coincide with the outer surfaces of the cog gear teeth 31, and wipe over the surface of the chamber wall in a region 33 at one side of the chambers. At the opposite side the teeth of the idler gears are fully withdrawn from between the rotor cog teeth, and spaced inward from their inner surfaces, and lune shaped abutments 34 are interposed between the teeth 31 and the idler gear teeth as shown. The arrangement of the rotor discs 30, cog gear teeth 31, idler gears 32 and abutments 34 forms a hydraulic motor in each chamber 26, by means of which the two shaft sections 27 may be driven.

Ports 35 and 36 enter the motor chambers at points above and below the region 33, and the chambers are distorted adjacent the ports to provide ways 37 for hydraulic fluid. The upper ports 35 are connected to the upper pipes 18, and the lower ports 36 to the lower pipes 19. As will be fully explained, the valve 15 is so arranged that the pressure fluid flowing from the pump 11 may be delivered to either pipes 18 or 19, and in case of such delivery to either, the others will be connected to the exhaust line 20. In this way the motor assemblies, and consequently the shafts 27 may be driven in either direction.

Between the outer surface of each rotor disc 30 and the adjacent end wall of the casing is arranged a thrust roller bearing assembly, the rollers 39 being interposed between the suitably shaped surface 40 of the rotor discs and tracks 41 that overlie the inner surfaces of the end walls. Ducts 42 open through the peripheral walls of the chambers 26 in the regions 33 through which the ends of the teeth of the idler gears 32 most closely approach the chamber walls, so that hydraulic fluid trapped between the rotor cog teeth by the idler teeth is pumped into the ducts by the idler teeth as they approach the ring gear. The duct nearest the intake or pressure port also relieves any vacuum that may be created as the teeth separate on the leaving side of their region of contact. These ducts 42 enter the spaces 43 within which the rollers 39 operate, so that the fluid flowing through them acts as a lubricant for the bearings. Pressure seals 44 are arranged in bores in the casing ends to prevent escape of this fluid. Exhaust passages 45 open into the spaces 43 and the reservoir 12 to conduct fluid back to the system after passing through the spaces 43.

Figure 5:
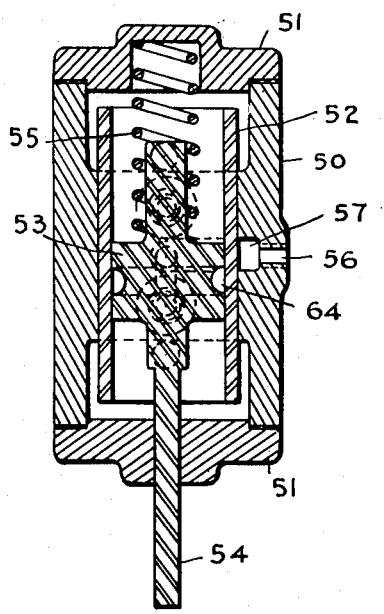
Figs. 5 and 6 are longitudinal sectional views of a control valve suitable for use in the system.
Figure 6:
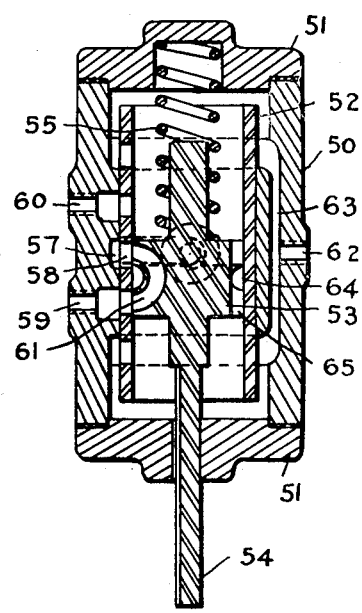
Figure 3:
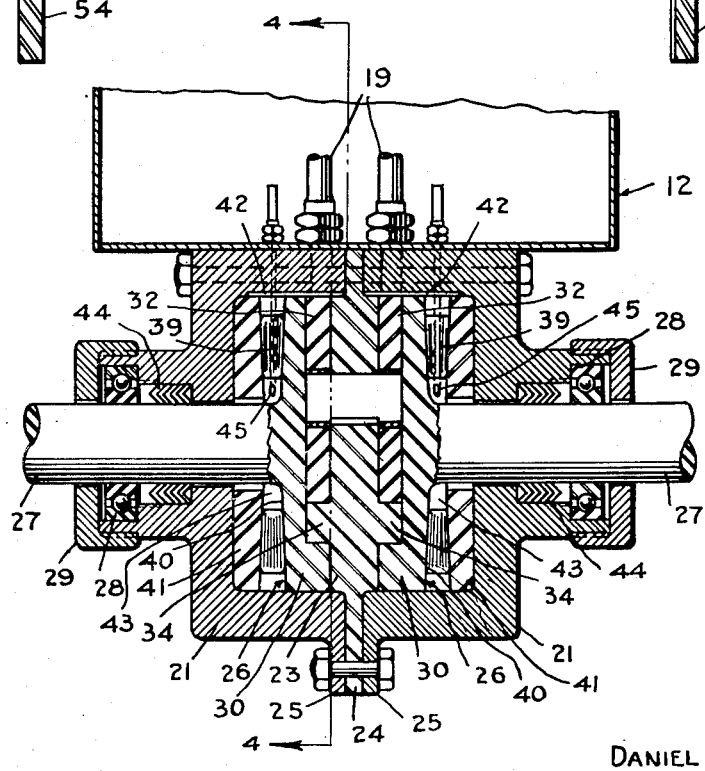
Fig. 3 is a horizontal, fragmentary sectional view on line 3—3 of Fig. 2.

Any suitable valve arrangement may be used at 15 to control operation of the motors, that shown in Figs. 5 and 6 being satisfactory. As shown, this valve is a manually operated, four-way, open center type, comprising a cylinder block 50 with heads 51, within which is mounted a cylindrical liner 52 in which a piston 53 is slidable under the influence of an actuating rod 54 and a return spring 55. An inlet port 56 communicates with a way 57 extending partly about the cylinder between its wall and the liner and communicating with a port 58 in the liner 52. Spaced equidistantly on opposite sides of the port 58 are distribution ports 59 and 60. A passage 61 is arranged in the piston for connecting either port 59 or 60 with the port 58. An outlet port 62 communicates with the interior of the liner 52 at each of its ends by passages 63. A by-pass 64 is arranged to connect the inlet port 56 and way 57 by passages 65 when the piston is in a position to cut off both distribution ports 59 and 60 from the port 58, thereby permitting free running of the motors under the influence of the axle sections due to movement of the vehicle.

In the system the inlet port 56 is connected with the pump 11 by the pipe 14, one distribution port 59 is connected with the pipe 16, valve 17 and pipes 18, while the other is connected with the pipes 19 by a manifold pipe 66. Outlet port 62 is connected with the return pipe 20, delivering to the reservoir 12.

Figure 7:
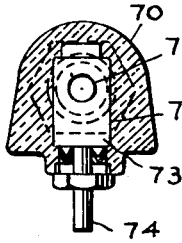
Fig. 7 is a transverse sectional view of a blocking valve that may be used for braking the mechanism.

A suitable valve for use at 17 is shown in Fig. 7. This valve is arranged to restrict passage of fluid, either to or from the motors through pipe 16, in order to act as a brake. The valve comprises a casing 70 having an axial bore 71, forming the passage from pipe 16 to pipes 18, and a transverse bore 72 intersecting the bore 71. A piston 73 is movable in the bore 72 by an adjusting rod 74, thereby controlling the effective area of the bore 71 for controlling the rate of flow of hydraulic fluid. Due to resistance to flow of hydraulic fluid, braking action may be effected by this valve 17 when the piston 73 is in such position that the inlet port 58 is by-passed to exhaust, in which position the ports 59 and 80 also are open to the interior of the liner 52 and consequently provide for free circulation of the fluid between them under pumping action of the motor when the rotors are turned by the shaft sections 27.

The invention is not restricted to the details of construction of the apparatus illustrated.

We claim:

1. A fluid motor comprising a casing enclosing a motor chamber having arcuate sides and opposing endwalls, a rotor carrying radially extending teeth on one side thereof rotatably mounted in said chamber concentrically with said arcuate side portions, an idler rotatably mounted parallel to said rotor but eccentric with respect thereto and having teeth which mesh with the teeth of said rotor in a reach along one of said arcuate sides, a thrust roller bearing assembly for said rotor disposed in a chamber between the rotor and an endwall of the casing, a fluid drainage and forced lubrication system comprising ducts in said casing leading from the reach of meshing of the rotor and idler to the bearing chamber, and exhaust means for escape of fluid from said chamber to the exterior of the casing.

2. A hydraulic power transmission mechanism for driving the two sections of a split power shaft comprising a casing enclosing a cylindrical motor chamber co-axial with said shaft sections and having opposing endwalls into which the ends of said shaft sections extend, a transverse partition dividing said chamber at its middle into two halves, a rotor mounted on the end of each shaft section to turn therewith, each rotor carrying radially extending circumferentially spaced gear teeth on its inner face, a freely rotatable toothed gear wheel mounted on each side of the partition on an axis parallel to said shaft sections but eccentric with respect to said rotors, one meshing internally with each rotor in a reach adjacent a specific section of the casing of said motor chamber, a correspondingly disposed lune on each side of said partition opposite each of said reaches filling the spaces between the ends of the teeth of each rotor and its respective gear wheel where they do not interengage, roller bearings situated between each endwall of the casing and the nearest rotor, inlet and outlet ports in the casing of each half of said motor chamber on opposite sides of said reach and opposite the ends of the gear teeth, and a fluid drainage and forced lubrication system comprising ducts in said casing leading from each reach to the section of the motor chamber holding the corresponding bearing, and exhaust means for escape of fluid from said last named chamber section to the exterior of the casing.

3. A hydraulic power transmission as claimed in claim 2 in which said inlet and outlet ports are connected through fluid carrying conductors to a power source and fluid discharge respectively, and said conductors are provided with control valves for regulating the flow therethrough.

THOMAS E. MAHLON.
DANIEL M. BAUER.

REFERENCES CITED

The following references are of record in the file of this patent:

UNITED STATES PATENTS

| Number | Name | Date |
|---|---|---|
| 788,848 | Riegel | May 2, 1905 |
| 1,150,478 | Zagora | Aug. 17, 1915 |
| 1,227,055 | Kellogg | May 22, 1917 |
| 1,257,225 | Hansen et al. | Feb. 19, 1918 |
| 1,292,091 | Schirmer | Jan. 21, 1919 |
| 1,313,415 | Peoples | Aug. 19, 1919 |
| 1,316,164 | Kettler | Sept. 16, 1919 |
| 1,497,050 | Wardwell | June 10, 1924 |
| 1,769,047 | Weeden | July 1, 1930 |
| 1,799,237 | Jensen | Apr. 7, 1931 |
| 1,816,508 | Wilsey | July 28, 1931 |
| 2,126,200 | Linderman | Aug. 9, 1938 |
| 2,509,321 | Topanelian | May 30, 1950 |

FOREIGN PATENTS

| Number | Country | Date |
|---|---|---|
| 500,693 | France | Jan. 2, 1920 |